United States Patent [19]

Sherman

[11] Patent Number: 4,541,198

[45] Date of Patent: Sep. 17, 1985

[54] TAMPER-PROOF RODENT BAIT STATION

[76] Inventor: Daniel A. Sherman, 148 Sandpiper Key, Secaucus, N.J. 07094

[21] Appl. No.: 668,167

[22] Filed: Nov. 2, 1984

Related U.S. Application Data

[63] Continuation-in-part of Ser. No. 509,457, Jun. 30, 1983.

[51] Int. Cl.$^4$ ............................................. A01M 1/20
[52] U.S. Cl. ..................................................... 43/131
[58] Field of Search .......................... 43/131, 58, 124

[56] References Cited

U.S. PATENT DOCUMENTS

| | | | |
|---|---|---|---|
| 1,561,644 | 11/1925 | Hanson | 43/131 |
| 2,480,724 | 8/1949 | Feussner | 43/131 |
| 2,683,326 | 7/1954 | Gardner | 43/131 |
| 2,690,029 | 9/1954 | Mullen | 43/131 |
| 3,965,609 | 6/1976 | Jordan | 43/131 |
| 4,031,653 | 6/1977 | Jordan | 43/131 |
| 4,161,079 | 7/1979 | Hill | 43/114 |
| 4,349,982 | 9/1982 | Sherman | 43/131 |
| 4,400,904 | 8/1983 | Baker | 43/131 |

FOREIGN PATENT DOCUMENTS 6617388  5/1968  Netherlands ........................ 43/131

*Primary Examiner*—Gene P. Crosby

[57] ABSTRACT

A tamper proof rodent bait station that is spill proof, tamper-proof and one in which the design and construction provides the user with a highly safe device for the placement of rodent poisons in areas in which they might come in contact with children, pets, wildlife and food products. The bait station may be made of colored plastic to simulate night and dim lighting in the interior, and can be mounted in an independent tray.

12 Claims, 7 Drawing Figures

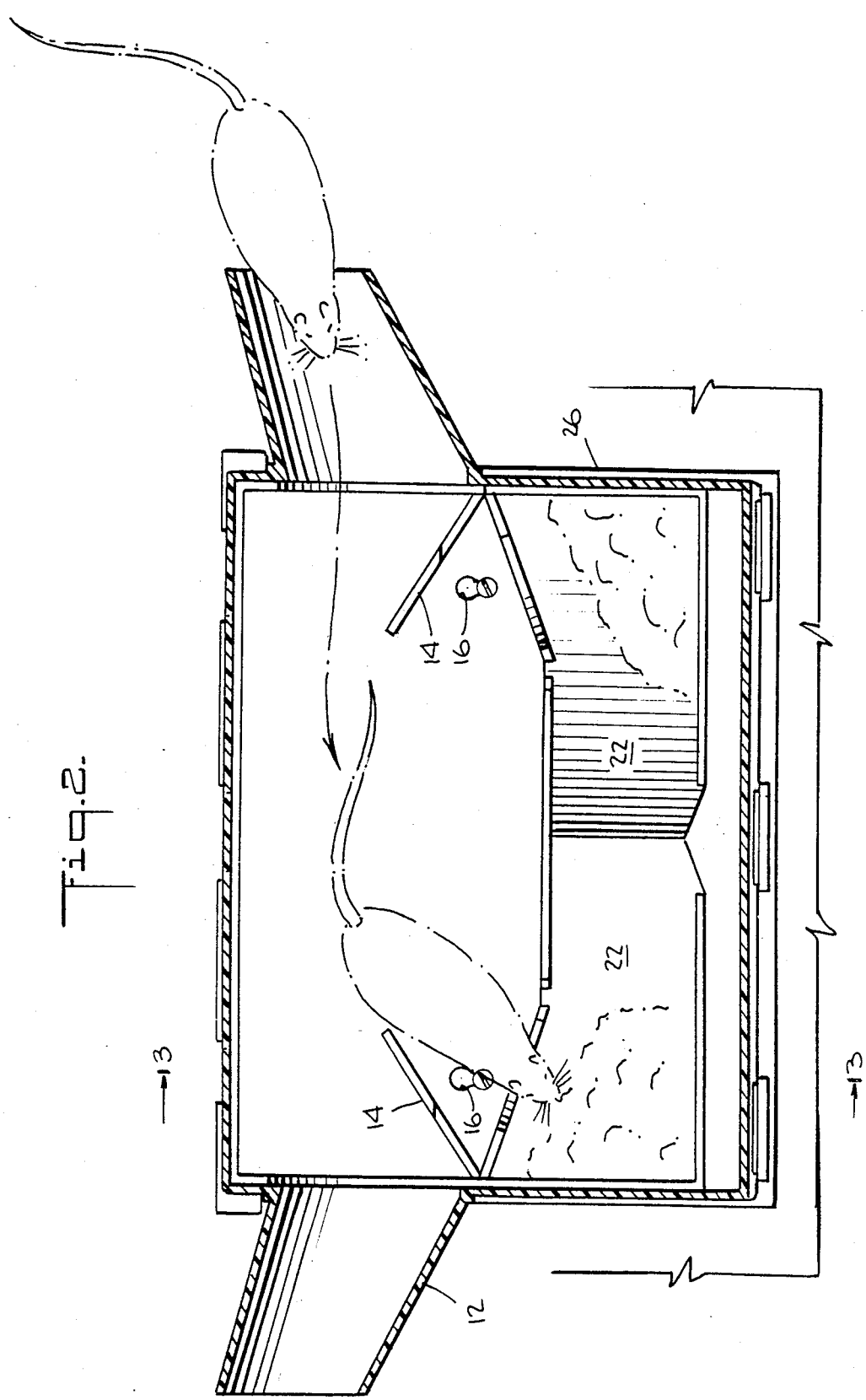

TAMPER-PROOF RODENT BAIT STATION

This application is a continuation-in-part of application Ser. No. 06,509,457, filed June 30, 1983.

BACKGROUND OF THE INVENTION

Rodent have plaqued mankind for centuries bringing disease and pestilance into major population centers and competing directly with mankind for food either by direct consumption or by fouling the stored materials with their droppings, dirt, and parasites.

There have been many solutions proposed in the past to control or reduce rodent populations, and the most effective to date has been the use of poisoned baits.

The technique employed by users of these baits is to place the bait in an area infested by rodents, particularly along the walls in areas were rodents have been seen traveling in.

The rodents passing through the area detect the poisoned bait and perceiving it as a food source, consume the poison causing their demise.

Some of the prior art devices which have been developed to contain and deliver rodenticides are characterized by U.S. Pat. Nos. 1,561,644 11/1925 Hanson ... 43/131, 2,480,724 8/1949 Feussner ... 43/131, 2,568,168 9/1951 Query ... 43/131, 2,626,089 1/1953 Osfar ... 222/561, 2,690,029 9/1954 Mullen ... 43/131, 2,725,664 12/1955 Mullen 43/131, 3,352,053 11/1967 Anderson .. . 43/131, 4,026,064 5/1977 Baker ... 43/131, 4,349,982 9/1982 Sherman ... 43/131 and Foreign Patent 648419 7/1937 Federal Republic of Germany ... 43/131.

These devices are defective for the following reasons: they are bulky, cumbersome, fragile, susceptable to rupture and in cases to spillage of their contents and, they present a potential hazard to children and domestic animals. Most of the devices only afford the illusion of protecting the bait from contaminating the environment.

On the whole, prior art devices do not advance the state of the art of rodenticide containment and will not fully meet the current laws of the U.S. Environmental Protection Agency and will in most cases endanger children and pets if placed in areas that are accessible to them.

An object of the present invention is to improve the state of the art by improving on the SHERMAN PATENT and provide an even more tamper-proof device that will withstand indoor and outdoor usage and will withstand high traffic and abuse in food processing areas, warehouses, farms, schools, and homes.

A further object of the instant invention is the provision of a tamper-proof rodent bait container that has a system of internal and external baffles that will prevent children from reaching into the box to tamper with its contents.

Another object of the instant invention is to provide a tamper-proof bait station in which the design of the cover protects the contents from weather and the elements, keeping the bait palatable for a longer period of time.

Still another object of the invention is to provide a tamper-proof baiter with a novel hidden method of closure that will foil or inhibit the possibility of unauthorized persons from opening the unit and exposing its contents.

Still another object of the instant invention is to provide a tamper-proof bait station with internal baffles that direct the rodent to the farthest point in which the bait is located, thereby insuring the least possible contact of the bait by unauthorized personnel or non-target species.

Yet another object of the invention is to provide a tamper-proof baiter whose floor is designed with a slope that moves the rodent poison to a desired position within the structure, collecting it and securing it, out of the reach of anyone trying to reach in from the outside.

And finally, the invention provides a method of floor mounting, that when the baiter is secured to the floor, will allow easy removal of the unit for cleaning and servicing, but will inhibit or foil movement of the baiter due to the tampering of small children, domestic pets, wildlife, or in the normal day to day activities of a commercial establishment.

Rodents, being nocturnal in nature, feed in low or no light environments and require the perception of night in order to feel comfortable feeding. This "security" of night feeding stimulates the rodents natural instincts and insures that they consume more food (or rodenticide) upon coming in contact with the food source.

With the introduction of "one feed" rodenticides, bait stations should be replenished more often and a minimum of this powerful poison should be used on each servicing of the device.

This insures the most economical use of expensive baits and the least possible exposure to baits by non target species. It also allows the best possible use of poisoned baits in ridding an area of large numbers of rodents.

To practically fulfil the need for more servicing of the baiter and, to provide the rodent with a habitat that imitates night conditions, a bait station, constructed of materials that are translucent, allowing the user to see in and measure visually the amount of bait left, to audit rodent activity and, to provide the rodent that enters the baiter with the illusion of night, would significantly increase the efficasy of the entire baiting system.

These and other objects, advantages and novel features of the invention will become apparent from the following description of the invention when considered in conjunction with the accompanying drawings.

BRIEF DESCRIPTION OF THE DRAWINGS

FIG. 1 demonstrates not only the mechanical configuration of the baiters internal structure but, also that of the material that the baiter is constructed of that provides a tranlucent quality and that allows the contents of the baiter, the rodent activity and the bait consumption, to be viewed without removal of the baiters cover.

FIG. 2 is a top plan view of the bait station showing the perspective and detail of the construction and interior detail including the internal baffles, the floor mounting feature, the sloped floor collecting bait, and the locking feature.

FIG. 3 also demonstrates the lip 32, which is formed in base member 26, to provide a method of sliding the baiter into a seperate channel fixture as shown in FIG. 5 that is mounted to the floor for added security of the bait station to a floor surface.

DETAILED DESCRIPTION OF THE PREFERRED EMBODIMENT

Figure 4:
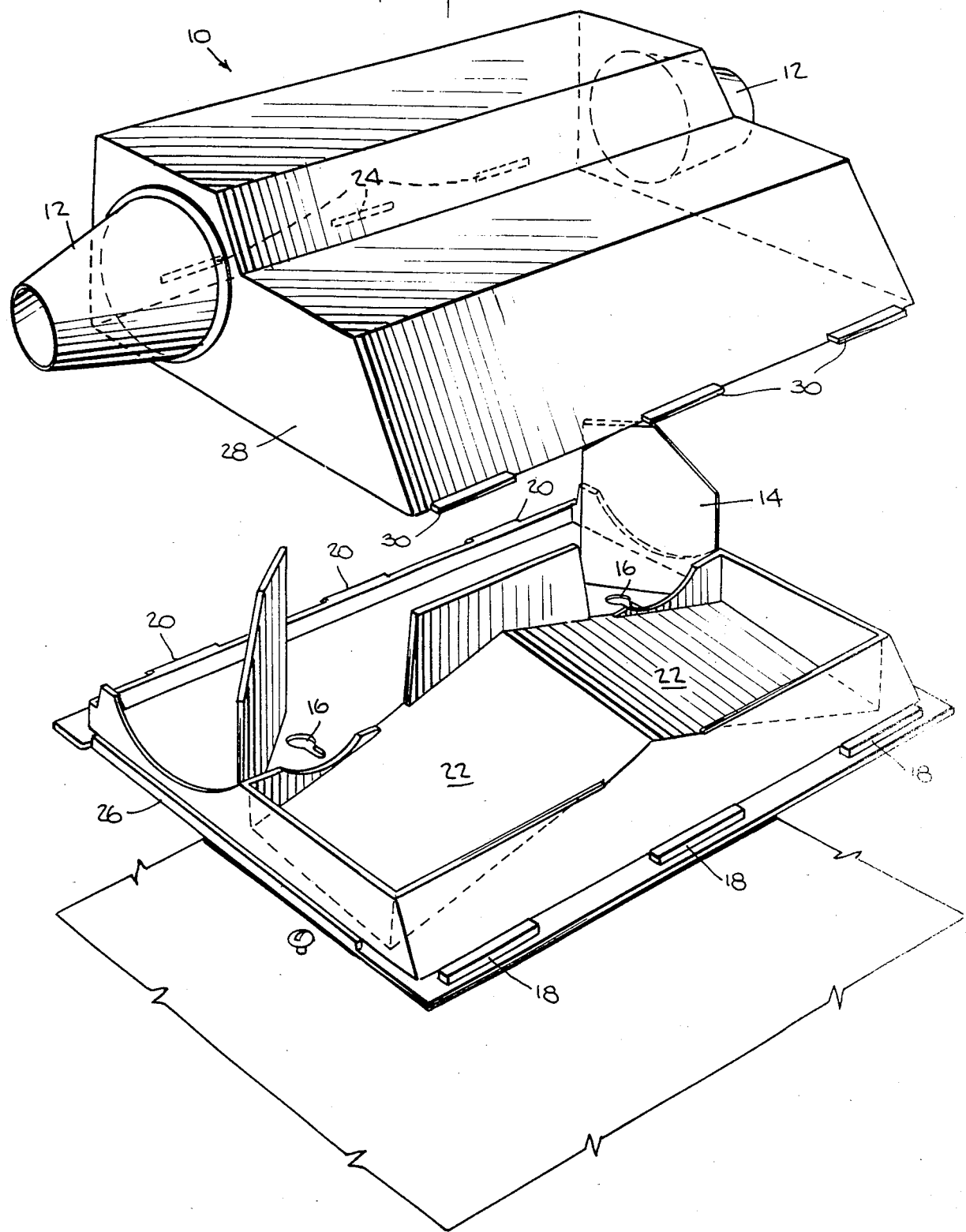
FIG. 4 is an exploded perspective view of the tamper-proof rodent bait station container which comprises the instant invention.

As can be seen by reference to FIG. 4, the tamper-proof rodent bait station container is designed generally as 10 and comprises a cover member 28 and a base member 26.

The cover member 28 is a solid body that includes two entrance holes contained in the tunnel structure 12, three rear slots 24 that cooperate with the base cams 20 and three front embossments 30 that cooperate with the base 18 to lock the unit securely. The entire cover structure 28 is made of solid material and will repel the entrance of water from rain or cleaning operations and foil attempts of children or pets to touch its contents.

The elongated tunnel structure 12 provides an opening for the rodent to enter the station and, when fastened to the floor, and against a vertical wall, produces a path that directs the rodent into the container while conforming to proven patterns of rodent behavior.

The elongated tunnel entrance 12 also directs a hand or other object towards the shielding baffle 14 and prevents contact with the bait which is contained in the base structure 26 and collected in the recess formed by the sloping floor 22.

As seen in FIG. 4, the base unit 26 is constructed with three raised members 18 at its front and three cams at its rear 20 which cooperate with cover members 30 and 24.

Figure 3:
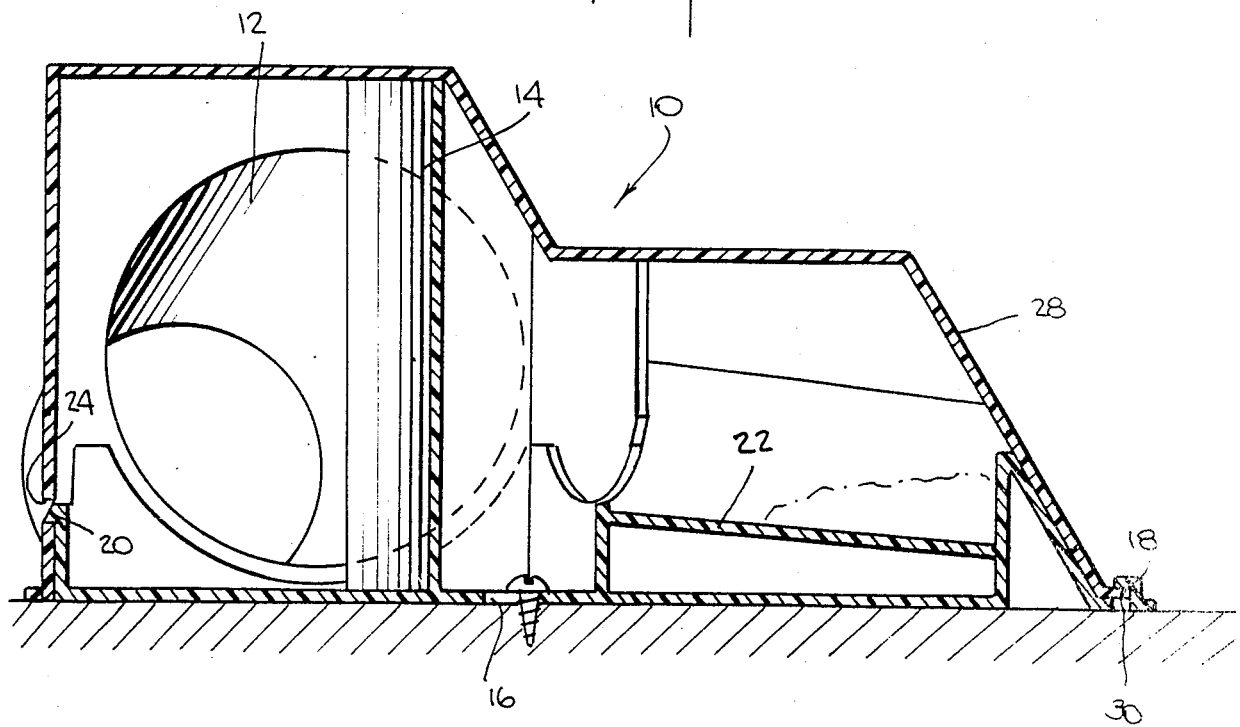
FIG. 3 is a cross-sectional detail view of the cover and base showing the side detail, the floor mounting detail, the sloped floor, and the hidden locking feature.

Reviewing FIG. 3 we see that when the embossment 30 on the cover member 28 are inserted into the raised members on the base 18 and the cover is pressed downward, the slots on the cover 24 are locked into the base cams 20 to complete a solid closure that resists any upward motion to open them.

Figure 1:
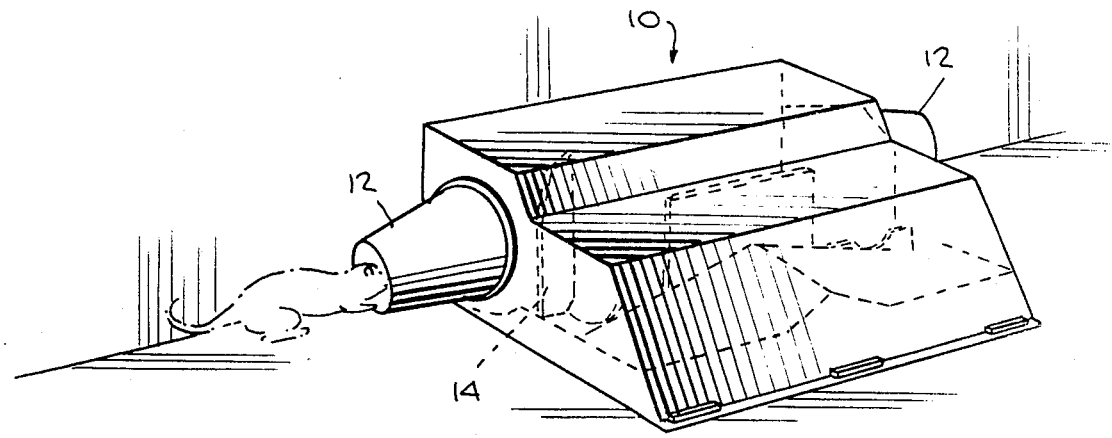
FIG. 1 is a detail drawing of the invention with the cover and base in place and the unit secured to a substrata and against a vertical wall.

Referring to FIG. 1 we see the baffle wall 14 in place and reviewing FIG. 4 the baffle wall 14 is shown in perspective as it blocks direct entrance to the area that contains the rodenticide. FIG. 2 shows the path of a rodent entering the baiter and demonstrates that because of the angle of the tunnel structure 12 and the corresponding angle of the baffle 14, it becomes impossible for a hand to reach in and contact the poison located at the area it has been collected in by the sloped floor 22. A rodent, because of its size and the fluid structure of its body, will have no difficulty in entering and traversing the baiter.

FIG. 3 shows the relationship between the tunnel opening in the tunnel structure 12, the baffle wall 14 and the sloped surface 22.

The angular construction of the cover 28 deflects blows by brooms and feet and protects the baiter from damage.

FIGS. 3 and 4 also show the cooperation of the cover and the base to form a tight, fitted structure that withstands abuse.

As demonstrated in FIGS. 4 and 3, the unit is mounted to the floor by keyhole slots 16 which provide a method of fastening the unit to the floor and yet allow the unit to be removed for cleaning and servicing.

This novel mounting feature protects the baiter from being moved and the dislodging of the bait by children and pets.

When mounted to a horizontal strata and against a vertical surface such as a wall, the baiter cannot be opened because its rear wall, which contains the slots 24, cannot be flexed to allow the cams on the base 20 to free themselves.

The only way to service the contents then becomes to free the baiter from the floor and flex the rear wall to move the slots 24 off the cams 20 and then to lift the rear of the baiter upward which will allow the front 30 to disengage from the base slots 18.

It should be noted that the cover member 28 is contructed to overlap the base member 26 and is the dominant structure in the overall configeration of the total rodent baiter.

This configeration provides additional protection to the rodenticide from moisture and assists in keeping the bait fresh when the baiter is placed in proximety to moisture.

The base unit 26, contains a lip on two sides which extend past the cover, at floor level, when the top and bottom members are joined together.

Figure 5:
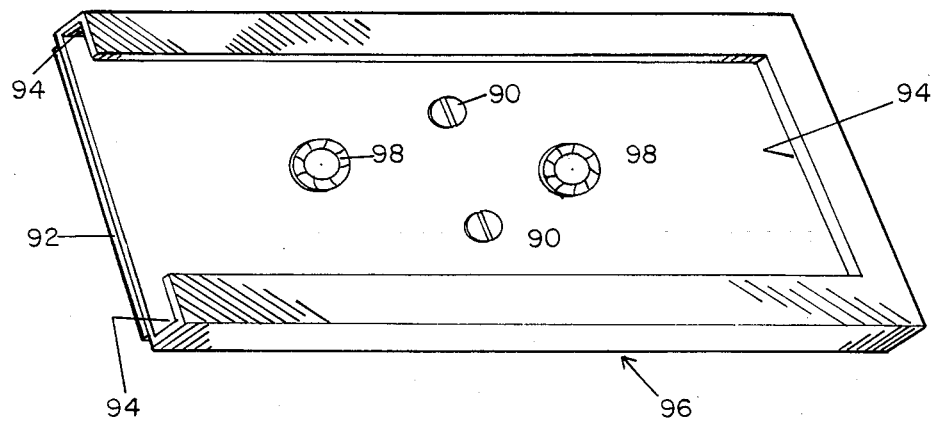
FIG. 5 shows the floor mounting unit consisting of an independent tray with channels designed to accept the lips formed on the baiter at sides and rear.
Figure 6:
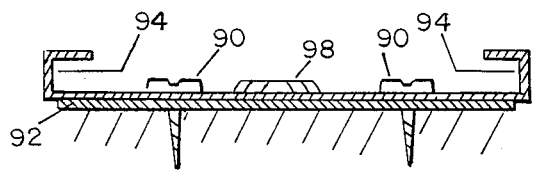
FIG. 6 is a cross section of the floor mounting unit showing two possible methods of mounting the tray to the floor, double sided tape and screws, both being demonstrated.

This lip 32, provides a method of mounting the unit to a separate floor mounted channel as shown in FIG. 5 and allows the baiter to be slid out of the floor mounting channel, which is glued or otherwise secured to the floor, for servicing and cleaning.

FIG. 1 showing the material construction of the baiter also demonstrates the use of a translucent material that will provide the interior of the baiter with a spectrum of light in the night shades. This coloring of the interior light is accomplished by utilizing a plastic or other material, of tranlucent quality, that converts natural or artificial light in the surrounding environment to shades of red, blue, green or other colors that will simulate night and dim lighting in the baiters interior.

FIG. 5 depicts the floor mounting unit 96 that can be secured to a substrata by alternate means such as screws 90 and double sided tape 92. As shown in FIG. 5, the floor mounting unit consists of an independent tray, with channels 94, formed in the side and rear of the unit to hold the baiter in place when the lips of the baiter have been slid into the channels.

Figure 7:
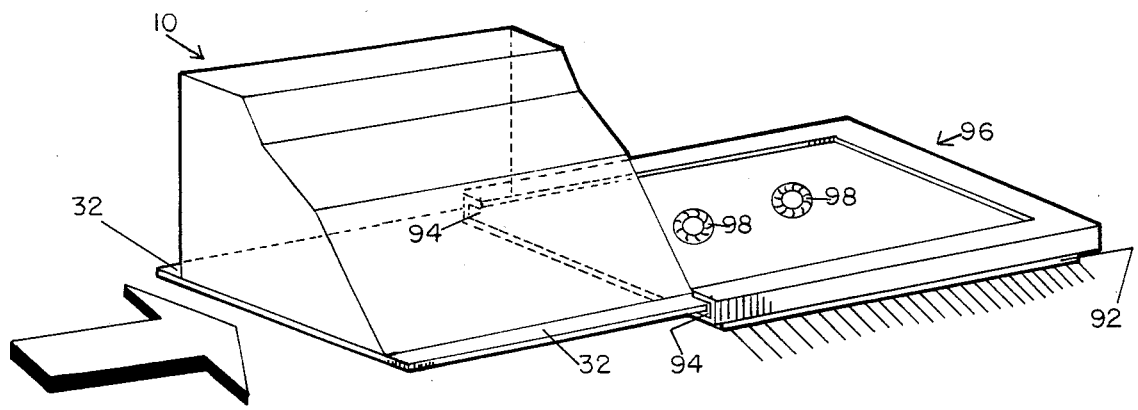
FIG. 7 demonstrates the cooperation between the baiter and the floor mounting unit.

Also depicted in FIG. 5 is the use of raised bosses 98 to hold the inserted baiter 10 tightly in place when fully inserted into the mounting unit. FIG. 7 shows the bait station in cooperation with the floor mounting unit 96. We clearly see the lips 32 of the baiter 10 being slid into the channels 94 of the mounting unit 96. The mounting unit 96 has been secured to the floor through the use of double sided tape 92 or as an alternate screws 90. The entire unit fits together to form an integrated rodent bait that is securely mounted to the floor and resists the efforts to tamper with its contents or to remove it from the area in which it has been installed.

What I claim is:

1. A tamper proof rodent bait station having a base member with first and second compartments divided by a partition, said partition containing openings at each of its ends and forming a baffle that inhibits spillage of bait from the second compartment;

cover member capable of being secured to said base member by means integral with said bait station;

said bait station containing apertures which open into the first of said compartments in the interior of the bait station, the apertures marking the ends of an internal passageway extending parallel to said partition and to a wall of the bait station, the improvement comprising:

the bait station containing two tunnel members, each extending outwardly from a respective aperture on the sides to form a pathway parallel with said wall, and in line with the internal passageway, for the rodents to enter and exit the bait station;

said base including deflective baffles, each positioned partially and angularly into the passageway for providing security in relation to poisoned bait in the second compartment, while allowing a rodent to traverse the passageway freely and, to obtain line of sight from one side to the other side prior to entering the bait station; said deflective baffles providing tamper-proof protection in combination with the tunnel members, whereby, access of hands are prevented from reaching around the deflective baffles into the second compartment on the side closest to the respective tunnel member, and said tunnel members elongating the distance to the second compartment to deny access of hands from reaching through a partition opening located at the opposite side of the bait station.

2. A tamper proof rodent bait station as in claim 1, said cover contains a plurality of locking bosses and recesses that cooperate with its base to form a secure tamper-proof closure.

3. A tamper proof rodent bait station as in claim 2 said base having a plurality of keyhole slots to mount the unit to a substrata for quick removal.

4. A tamper proof rodent bait station as in claim 3 whose base is constructed with sloping floors to collect the bait in desired areas away from possible tampering and for ease of rodent feeding.

5. A tamper proof bait station as in claim 4 said deflective baffles being independent and protect the bait compartment from access by prying hands and larger domestic animals or wildlife.

6. A tamper proof rodent bait station as in claim 5 whose cover is the dominant structure, made of material impervious to weather and when used in conjunction with its base, will form a tamper-proof bait containment device.

7. A tamper proof rodent bait station as in claim 6, having angular construction which deflects blows from feet and brooms, protecting its contents from dislodging and contaminating the environment.

8. A tamper-proof rodent bait station as in claim 7 wherein said cover contains the appertures for the enterance and egress of the target species and which overlaps the base.

9. A tamper proof rodent bait station, as in claim 1, said base contains a lip, that protrudes from its side when the cover member is in place and, which can be slid into a separate mounting device having an independent channel that is glued or otherwise fastened to the floor.

10. A tamper proof rodent bait station, as in claim 1, constructed of a tranlucent material that converts ambient light night shades of color and dim lighting to the interior of the bait station and a bait station that will allow the contents of the bait station to be viewed though these "colored" tranlucent walls without removal of any portion of the bait station.

11. A tamper proof rodent bait station, as in claim 1, having an independent tray for mounting the bait station securely to the floor which will allow the bait station to be removed for cleaning and servicing after the tray has been secured to the floor.

12. A tamper proof rodent bait station as in claim 1, wherein said station contains adhesive strips to mount the bait station to the floor in order to resist tampering or movement of the bait station.

* * * * *